US009162673B2

(12) United States Patent
Kawamoto et al.

(10) Patent No.: US 9,162,673 B2
(45) Date of Patent: Oct. 20, 2015

(54) GEAR SHIFT CONTROL SYSTEM FOR AUTOMATIC TRANSMISSION

(71) Applicant: SUZUKI MOTOR CORPORATION, Shizuoka (JP)

(72) Inventors: Shuhei Kawamoto, Shizuoka (JP); Satohiro Yoshida, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 0 days.

(21) Appl. No.: 13/962,125

(22) Filed: Aug. 8, 2013

(65) Prior Publication Data
US 2014/0066251 A1    Mar. 6, 2014

(30) Foreign Application Priority Data

Sep. 6, 2012 (JP) .................................. 2012-196314

(51) Int. Cl.
B60W 10/00 (2006.01)
B60W 20/00 (2006.01)
B60W 10/11 (2012.01)
B60W 10/18 (2012.01)
B60W 30/18 (2012.01)
(Continued)

(52) U.S. Cl.
CPC .............. *B60W 20/30* (2013.01); *B60W 10/11* (2013.01); *B60W 10/18* (2013.01); *B60W 30/18072* (2013.01); *F16H 61/0213* (2013.01); *F16H 61/16* (2013.01); *F16H 61/21* (2013.01); B60W 2720/106 (2013.01); F16H 2061/0237 (2013.01); F16H 2061/163 (2013.01); Y10S 903/947 (2013.01); Y10T 477/24 (2015.01); Y10T 477/647 (2015.01)

(58) Field of Classification Search
CPC ...... B60W 20/30; B60W 10/11; B60W 10/18
USPC ......... 477/94, 5, 4, 92, 70; 180/65.265, 65.31
See application file for complete search history.

(56) References Cited

U.S. PATENT DOCUMENTS 8,062,175 B2 * 11/2011 Krueger et al. ................. 477/29
8,573,709 B2 * 11/2013 Suzuki et al. ..................... 303/3
(Continued)

FOREIGN PATENT DOCUMENTS

JP    10-238621 A    9/1998

OTHER PUBLICATIONS

Braess, et al., "Vieweg Handbook of Motor Vehicle Technology," 6th updated and extended edition [Electronic Resource], Wiesbaden, VIEWEG+TEUBNER, 2012, ISBN: 9783834882981 (Total 92 pages: Title; pp. 145; pp. 277-316; p. 353; pp. 492-533; and pp. 757-762).
(Continued)

*Primary Examiner* — David J Hlavka
(74) *Attorney, Agent, or Firm* — Rothwell, Figg, Ernst & Manbeck, P.C.

(57) ABSTRACT

A gear shift control system for vehicles is provided which mathematically calculates a rate of deceleration of the vehicle equipped an automatic transmission upon start of deceleration of the vehicle and inhibits the automatic transmission from upshifting or changes a permissible gear shift range of the automatic transmission as a function of the rate of deceleration of the vehicle, thereby ensuring a desired degree of braking force including an engine braking force while the vehicle is decelerating.

9 Claims, 11 Drawing Sheets

(51) Int. Cl.
*F16H 61/02* (2006.01)
*F16H 61/16* (2006.01)
*F16H 61/21* (2006.01)

(56) References Cited

U.S. PATENT DOCUMENTS

| | | | |
|---|---|---|---|
| 2008/0176708 A1* | 7/2008 | Tamai et al. | 477/125 |
| 2009/0118885 A1* | 5/2009 | Heap et al. | 701/22 |
| 2009/0233762 A1* | 9/2009 | Choby | 477/94 |
| 2010/0106386 A1* | 4/2010 | Krasznai et al. | 701/70 |
| 2010/0304922 A1* | 12/2010 | Ohkubo et al. | 477/4 |
| 2012/0101699 A1* | 4/2012 | Boissinot et al. | 701/54 |

OTHER PUBLICATIONS

Isermann, "Electronic Management of Motor Vehicle Drives [Electronic Resource]," Wiesbaden, VIEWEG+TEUBNER, 2010, ISBN: 9783834893895 (Total 42 pages: Title; pp. 288-327).

Official Action mailed May 15, 2014 in corresponding German Patent Application No. 10 2013 216 724.5, filed Aug. 22, 2013 (with an English translation) (14 pages).

The First Office Action mailed Jun. 30, 2015 in corresponding Chinese Patent Application No. 201310362117.X (with an English translation) (13 pages).

* cited by examiner

FIG. 2

| BRAKING FORCE (N) | VEHICLE SPEED [km/h] | | | | |
|---|---|---|---|---|---|
| | 0 | 50 | 100 | 150 | ... |
| BRAKE STROKE [%] 0 | *** | *** | *** | *** | *** |
| 10 | *** | *** | *** | *** | *** |
| 20 | *** | *** | *** | *** | *** |
| 30 | *** | *** | *** | *** | *** |
| 40 | *** | *** | *** | *** | *** |
| 50 | *** | *** | *** | *** | *** |
| 60 | *** | *** | *** | *** | *** |
| 70 | *** | *** | *** | *** | *** |
| 80 | *** | *** | *** | *** | *** |
| 90 | *** | *** | *** | *** | *** |
| 100 | *** | *** | *** | *** | *** |

FIG. 3

| VEHICLE SPEED [km/h] | 10 | 20 | 50 | ... |
|---|---|---|---|---|
| 1st DECEL. THRESHOLD [m/s$^2$] | X1 | X2 | X3 | ... |

| VEHICLE SPEED [km/h] | 10 | 20 | 50 | ... |
|---|---|---|---|---|
| 4th DECEL. THRESHOLD [m/s²] | Y1 | Y2 | Y3 | ... |

GEAR SHIFT CONTROL SYSTEM FOR AUTOMATIC TRANSMISSION

CROSS REFERENCE TO RELATED DOCUMENT

The present application claims the benefit of priority of Japanese Patent Application No. 2012-196314 filed on Sep. 6, 2012, the disclosure of which is totally incorporated herein by reference.

BACKGROUND OF THE INVENTION

1. Technical Field of the Invention

The present invention relates generally to a gear shift control system for an automatic transmission for vehicles, and more particularly to such a control system designed to control an operation of the automatic transmission when it is required to decelerate the vehicle.

2. Background Art

Usually, an internal combustion engine in automotive vehicles is rotated in a selected one of multiple gear ranges in order to drive road wheels of the vehicle at a desired torque. Specifically, the vehicle has an automatic transmission disposed between a drive shaft and the wheels to provide a given torque to the wheels either in a low-speed range or in a high-speed range Typical automatic transmissions work to automatically change gear ratios as a function of relation of the position of an accelerator operated by the driver of the vehicle and the speed of the vehicle to transmit torque, as outputted by the internal combustion engine, to the wheels. For instance, the automatic transmission is, as demonstrated in FIG. 14, designed to change the gear ratios at the time when the relation (i.e., a locus) between the position of the accelerator and the speed of the vehicle meets one of upshift gear shift lines US or downshift gear shift lines DS prepared one for each of a set of gear ranges (see Japanese Patent First Publication listed below). The automatic transmission, as taught in this publication, is engineered to inhibit an upshift thereof (i.e., fix a selected one of the gear ranges) or establish a downshift by one gear to enhance the efficiency of engine braking when the vehicle is running on an slope.

Japanese Patent First Publication No. 10-238621.

The driver of the vehicle, as demonstrated by a speed reduction locus DT in FIG. 14, may release the accelerator pedal suddenly for some reason while the vehicle is accelerating, and then depress the brake pedal strongly to decelerate the vehicle rapidly. This causes the speed reduction locus DT to intersect with the upshift gear shift lines US several times. The automatic transmission, thus, upshifts several times in a gear shift control mode even though the speed of the vehicle is not very high, which results in an increased possibility that the speed of the internal combustion engine falls in an engine stall range. Additionally, the speed reduction locus DT also intersects with the downshift gear shift lines DS several times to establish the downshift of the automatic transmission. This results in sequential application of sudden engine braking to the vehicle, which will give occupants of the vehicle an uncomfortable ride and also lead to a bad maneuverability of the vehicle.

When the vehicle is decelerating on a slope, the gear shift control system, as taught in the above publication, works to control the operation of the automatic transmission to provide the engine braking to ensure the continuity of speed reduction control. Specifically, the gear shift control system calculates an inclination of the road and, when the inclination exceeds a given threshold, controls an upshift of the automatic transmission. The gear shift control system also calculates a rate of deceleration of the vehicle and, when such a rate exceeds a given threshold, instructs the automatic transmission to downshift to produce engine braking. Usually, the rate of deceleration is derived by calculating a change in speed of the vehicle for a set period of time. The comparison of the rate of deceleration with the threshold is, therefore, made after a lapse of the set period of time following the start of deceleration of the vehicle. This may cause the automatic transmission to upshift or downshift undesirably depending upon the relation between the speed of the vehicle and the position of the accelerator pedal, which may result in a lack of braking force when the vehicle has started decelerating suddenly during acceleration.

It is, therefore, an object to provide a gear shift control system for an automatic transmission which is mounted in a vehicle along with a power source such as an internal combustion engine or an electric motor and designed to inhibit the automatic transmission from shifting gear ratios undesirably frequently, avoid the stall of the power source without sacrificing a comfortable ride and maneuverability of the vehicle.

According to one aspect of the invention, there is provided a gear shift control system for an automatic transmission mounted in a vehicle to transmit torque, as produced by a power source, to a wheel of the vehicle. The gear shift control system comprises: (a) a speed determiner which works to determine a speed of the vehicle; (b) a deceleration detector which detects deceleration of the vehicle when a braking force is being applied to the wheel; (c) a braking force determiner which determines the braking force applied to the wheel when the deceleration detector is detecting the deceleration of the vehicle; (d) a deceleration determiner which determines a deceleration of the vehicle as a function of the speed of the vehicle, as determined by the speed determiner, and the braking force, as determined by the braking force determiner; and (e) a gear shift controller which determines whether the deceleration of the vehicle, as determined by the deceleration determiner, is greater than a given deceleration threshold. When the deceleration of the vehicle is determined to be greater than the given deceleration threshold, the gear shift controller inhibits the automatic transmission from upshifting gears thereof.

In the first preferred mode of the invention, the vehicle is equipped with a brake pedal which is responsive to depression thereof to produce the braking force. The gear shift control system further includes an amount-of-braking effort determiner which works to determine an amount by which the brake pedal is depressed. The deceleration detector detects the deceleration of the vehicle when the braking force is being applied to the wheel in response to the depression of the brake pedal. The braking force determiner calculates the braking force applied to the wheel when the deceleration detector is detecting the deceleration of the vehicle as a function of the speed of the vehicle, as determined by the speed determiner, and the amount by which the brake pedal is depressed, as determined by the amount-of-braking effort determiner.

In the second preferred mode of the invention, the vehicle is equipped with an accelerator pedal which is responsive to depression thereof to accelerate the vehicle. The gear shift control system may further include an amount-of-acceleration determiner which works to determine an amount by which the accelerator pedal is depressed. The deceleration detector may detect the deceleration of the vehicle when the braking force is being applied to the wheel in response to release of the accelerator pedal. The braking force determiner may calculate the braking force applied to the wheel which arises from the release of the accelerator pedal.

In the third preferred mode of the invention, the vehicle may be equipped with either or both an internal combustion engine and an electric generator which serve to produce the braking force applied to the wheel. The braking force determiner may determine one or the sum of an engine braking force, as produced by the internal combustion engine, and a regenerative braking force, as produced by the electric generator, as the braking force applied to the wheel.

In the fourth preferred mode of the invention, the braking force determiner may determine a regenerative electric energy which is produced by the electric generator and being charged in a storage battery mounted in the vehicle and calculate the regenerative braking force based on the determined regenerative electric energy to determine the braking force.

In the fifth preferred mode of the invention, the given deceleration threshold may be set to change to have one of a plurality of values as a function of the speed of the vehicle. The plurality of values are different from each other. When the deceleration of the vehicle is determined to be greater than a greatest one of the values, the gear shift controller may inhibit the automatic transmission from upshifting gears thereof. When the deceleration of the vehicle is determined to be greater than one of the values other than the greatest one, the gear shift controller permits the automatic transmission from upshifting in a range of a given number of gear ratios. The smaller the values, the greater the given number of gear ratios.

Effect of the Invention

In the one aspect of the invention, at the time when finding the deceleration of the vehicle subjected to the braking force, the gear shift control system immediately starts to derive the speed of the vehicle and the braking force to calculate the deceleration (i.e. the rate of deceleration) of the vehicle. When the deceleration is greater than the deceleration threshold, the gear shift control system inhibits the automatic transmission from upshifting. In other words, even when the vehicle has started to decelerate suddenly during acceleration, the automatic transmission is immediately inhibited from upshifting before a lapse of a set period of time needed to monitor a change in speed of the vehicle to determine the deceleration of the vehicle. This avoids lots of unwanted gear shifts during sudden deceleration of the vehicle and ensures a comfortable ride and maneuverability of the vehicle.

In the first preferred mode of the invention, the gear shift control system is responsive to the depression of the brake pedal to detect the event of deceleration of the vehicle. The gear shift control system, therefore, works to use the braking force resulting at least from the depression of the brake pedal to determine the deceleration of the vehicle, thus resulting in an enhanced quality of the gear shift inhibition control.

In the second preferred mode of the invention, the gear shift control system is responsive to the release of the accelerator pedal to detect the event of deceleration of the vehicle. The gear shift control system, therefore, works to use the braking force resulting at least from the release of the accelerator pedal to determine the deceleration of the vehicle, thus resulting in an enhanced quality of the gear shift inhibition control.

In the third preferred mode of the invention, the gear shift control system is capable of using the engine braking, as produced by the internal combustion engine, and/or the regenerative braking force, as produced by the electric motor, to calculate the braking force, thus resulting in an enhanced accuracy in calculating the braking force to improve the quality of the gear shift inhibition control.

In the fourth preferred mode of the invention, the gear shift control system is capable of determining the regenerative braking force, as produced by the electric generator upon the release of the accelerator pedal, by directly measuring the amount of current created by the regenerative electric energy which is produced by the electric generator and being charged into the storage battery. This facilitates the ease of calculating the braking force acting on the wheel of the vehicle equipped with the electric generator, thus realizing the high-quality gear shift inhibition control at a decreased cost.

In the fifth preferred mode of the invention, the gear shift control system works to change an permissible gear shift range of the automatic transmission as a function of the degree of deceleration of the vehicle. This is achieved by changing the value of the deceleration threshold to select the permissible gear shift range of gear ratios to which the automatic transmission is permitted to upshift based on comparison of the value of the deceleration threshold and the deceleration of the vehicle, thereby enhancing the quality of the gear shift inhibition control and efficiency in application of the braking force to the wheel.

BRIEF DESCRIPTION OF THE DRAWINGS

FIG. 2 is an illustration which shows a braking force map for use in gear shift control of the gear shift control system of FIG. 1;

FIG. 3 is an illustration which shows a first deceleration decision map for use in gear shift control of the gear shift control system of FIG. 1;

DESCRIPTION OF THE PREFERRED EMBODIMENT

Figure 1:
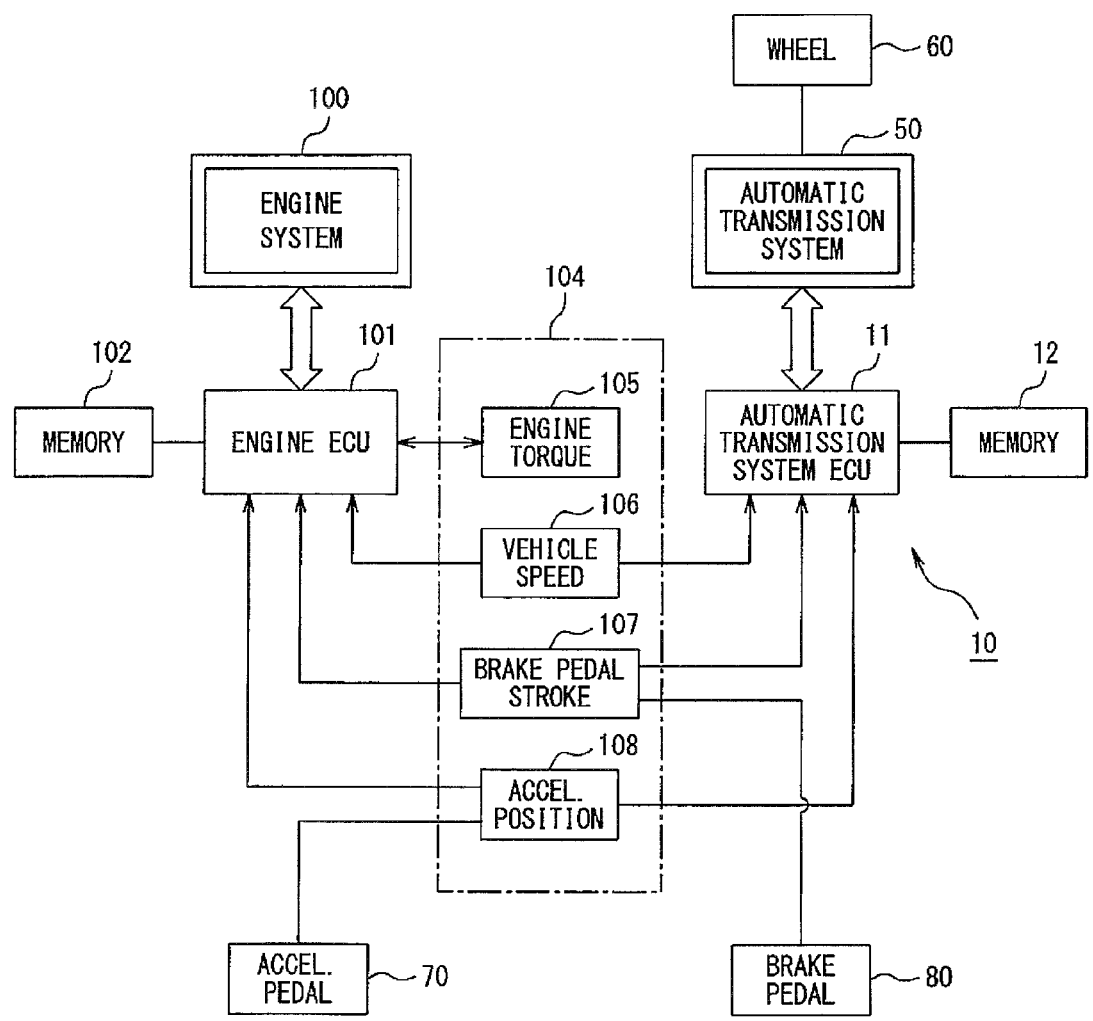
FIG. 1 is a block diagram which illustrates a gear shift control system of the first embodiment for an automatic transmission which is mounted in an automotive vehicle.

Embodiments will be described below with reference to the drawings. FIGS. 1 to 7 illustrate a gear shift control system 10 for an automatic transmission according to the first embodiment.

The gear shift control system 10 is designed to control an operation of the automatic transmission which is mounted on an automotive vehicle along with an internal combustion engine. The automatic transmission works to automatically change the speed of a drive shaft of the internal combustion engine and transmit the torque of the drive shaft to a drive axle of road wheels 60 to run the vehicle.

The internal combustion engine, as referred to herein, is engineered to burn a mixture of air and fuel sprayed into combustion chambers to reciprocate pistons, thereby rotating the drive shaft through a crankshaft to output the torque. An engine system 100 which includes the internal combustion engine and components or actuators such as fuel injectors is generally controlled in operation by an engine ECU (Electronic Control Unit) 101. The engine ECU 101 works to execute an engine control program, as stored in a memory 102, to control the operation of the engine system 100 based on outputs from a sensor group 104 and/or given parameters.

The automatic transmission is disposed between the drive shaft of the internal combustion engine (i.e., the engine system 100) and the drive axle of the wheels 60 of the vehicle and engineered to automatically change the gear ratios thereof as a function of the rotational speed of the engine and the speed of the vehicle when the torque is transmitted from the drive shaft of the engine to the drive axle of the wheels 60. The gear shift control system 10 works to automatically control engagement of clutches of the automatic transmission to select one of the gear ratios, that is, upshift or downshift the automatic transmission. Specifically, the gear shift control system 10 includes an automatic transmission ECU (Electronic Control Unit) 11 which works to execute a gear shift control program, as stored in the memory 12, to control an operation of an automatic transmission system 50 based on the outputs from the sensor group 104 and/or given parameters. The automatic transmission system 50 includes the automatic transmission and other components such as the clutches. The automatic transmission ECU 11 works to control operations of the components of the automatic transmission system 50 using the outputs from the sensor group 104 and data stored in the memory 12 as a function of a vehicle running condition established by a driver's effort on the accelerator pedal 70 of the vehicle.

The engine ECU 101 monitors the outputs from the sensor group 104 to derive drive information needed for drive control of the vehicle. The sensor group 104 includes an engine torque determiner 105, a vehicle speed determiner 106, a brake pedal 80 stroke determiner 107, and an accelerator position determiner 108 which are connected to the engine ECU 101. The engine ECU 101 controls the operation of the internal combustion engine (i.e., the engine system 100) using the outputs from the sensor group 104 and data stored in the memory 102 as a function of a vehicle running condition established by a driver's effort on the brake pedal 80 (also called a foot brake) or the accelerator pedal 70.

The engine torque determiner 105 is implemented by, for example, a sensor designed to measure the speed Nt of the drive shaft of the internal combustion engine. The engine torque determiner 105 works to determine an engine torque Er as a function of the speed Nt and a gear ratio S, as inputted from the automatic transmission ECU 11. The vehicle speed determiner 106 is equipped with a vehicle speed sensor which works to measure the speed (the number of revolutions per unit time) of the drive axle of the wheels 60. The vehicle speed determiner 106 calculates the speed of the vehicle as a function of the measured speed of the drive axle of the wheels 60 and an effective radius D of the wheels 60. The effective radius D, as referred to herein, is the distance between the axis of rotation of tires inflated at a standard air pressure and the circumference of the tires which makes contact with the road surface.

The brake pedal stroke determiner 107 is equipped with a brake pedal stroke sensor (also called a brake pedal position sensor) which works as an amount-of-braking effort determiner to measure an amount by which the brake pedal 80 is depressed by the driver (i.e., a stroke BS of the brake pedal 80) to decelerate or stop the vehicle. The brake pedal stroke determiner 107 calculates the stroke BS of the brake pedal 80 in terms of percentage (%) where the stroke BS immediately before brakes start to be applied to the wheels 60 is 0%, and the stroke BS when the brakes are fully applied to the wheels 60 is 100%.

The accelerator position determiner 108 is equipped with an accelerator stroke sensor (also called an accelerator position sensor) which works as an amount-of-acceleration determiner to measure an amount by which the accelerator pedal 70 is depressed by the driver (i.e., a stroke AS of the accelerator pedal 70) to accelerate the vehicle. The accelerator position determiner 108 calculates the stroke AS of the accelerator pedal 70 in terms of percentage (%) where the stroke AS when the fuel injectors are deactivated so that no fuel is sprayed into the combustion chambers of the engine is 0%, and the stroke AS when the fuel injectors are activated to spray a maximum amount of fuel into the combustion chambers of the engine to accelerate the vehicle fully is 100%.

The automatic transmission ECU 11 shares the vehicle speed determiner 106, the brake pedal stroke determiner 107, and the accelerator position determiner 108 with the engine ECU 101 to perform a gear shift control operation to select one of the gears of the automatic transmission which is suitable for the running condition of the vehicle. Specifically, the gear shift control system 10 consists essentially of the automatic transmission ECU 11, the memory 12, the vehicle speed determiner 106, the brake pedal stroke determiner 107, and the accelerator position determiner 108.

Figures 13, 14:
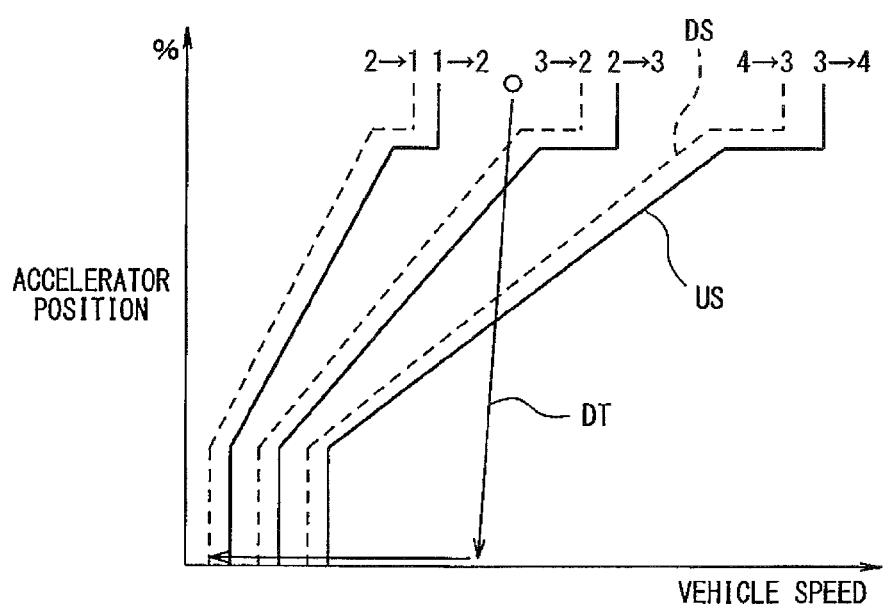
FIG. 13 is an illustration which shows a fourth deceleration decision map for use in gear shift control of the gear shift control system of FIG. 11.
FIG. 14 is a map representing a gear shifting schedule for an automatic transmission in standard gear shift control.

Specifically, the automatic transmission ECU 11 performs a gear shift control task (which will also be referred to below as a normal gear shift control operation) to shift, as illustrated in FIG. 14, the gear ratios at the time when the locus representing the relation between the position of the accelerator pedal 70 and the speed of the vehicle during acceleration or deceleration of the vehicle intersects with one of the upshift gear shift lines US or the downshift gear shift lines DS. The automatic transmission ECU 11 also uses a braking force map (i.e., a table), as illustrated in FIG. 2, and a first deceleration decision map (i.e., a table), as illustrated in FIG. 3, to control the upshift or downshift of the vehicle as a function of a rate of deceleration of the vehicle while the vehicle is decelerating.

Figure 4:
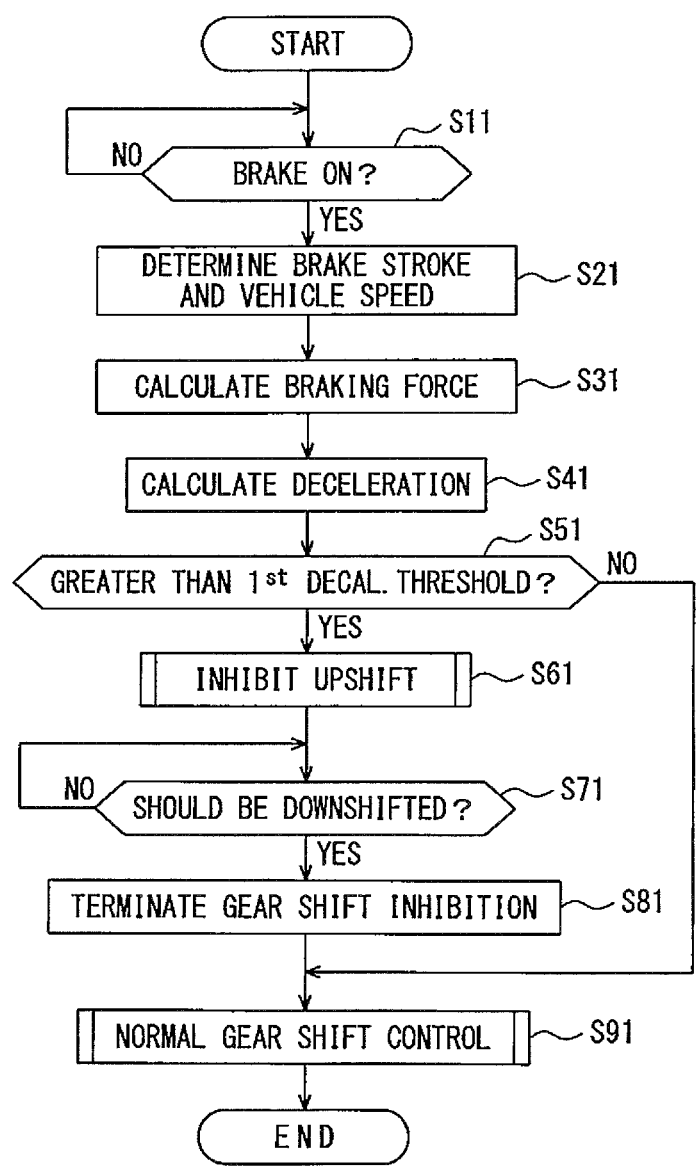
FIG. 4 is a flowchart of a gear shift control program to be executed by the gear shift control system of FIG. 1.

Specifically, the automatic transmission ECU 11 executes a gear shift control program, as shown in a flowchart of FIG. 4, and determines in step S11 whether the brake pedal stroke determiner 107 has detected the stroke BS of the brake pedal 80 which is greater than 0% or not, that is, whether the brake pedal 80 has been depressed or not. If a NO answer is obtained, the routine repeats step S11.

If the brake pedal 80 is determined in step S11 as having been depressed, in other words, the vehicle has begun to decelerate, the routine proceeds to step S21 wherein the stroke BS of the brake pedal 80, as determined by the brake pedal stroke determiner 107, and the vehicle speed Vs, as determined by the vehicle speed determiner 106, are derived.

The routine proceeds to step S31 wherein a feed-forward control mode is entered to calculate a braking force F1 (N) applied to the wheels 60 by look-up using the braking force map of FIG. 2 in relation to the stroke BS of the brake pedal 80 and the vehicle speed Vs, as derived in step S21. The routine then proceeds to step S41 wherein the braking force F1, as derived in step S31, a travel resistance F2 of the vehicle, and a weight M of the vehicle which are pre-stored in the memory 12, are substituted into an equation (1) below to determine a deceleration a1 representing the rate of deceleration of the vehicle. The value of the travel resistance F2 may be derived by look-up using a map stored in the memory 12 which lists relations of values of the travel resistance F2 to values of air resistance defined as a function of the vehicle speed Vs, values of rolling resistance (also called rolling drag) of the wheels 60, and values of grade resistance acting on the vehicle.

$$a1 = (F1+F2)/M \quad (1)$$

The routine then proceeds to step S51 wherein the deceleration a1, as derived in step S41, is compared with a first deceleration threshold value Xn to determine whether the deceleration a1 is greater than the first deceleration threshold value Xn or not. The first deceleration threshold value Xn has a correlation with the speed of the vehicle and is selected from the first deceleration decision map, as illustrated in FIG. 3, which lists the first deceleration threshold value Xn in relation to the vehicle speed Vs and is stored in the memory 12. The first deceleration threshold value Xn is set to be increased with an increase in speed of the vehicle. For instance, when the speed (km/h) of the vehicle is 10, 20, 30 . . . , the first deceleration threshold value Xn is selected to have X1, X2, X3, . . . (X1<X2<X3 . . . ). If a YES answer is obtained in step S51 meaning that the deceleration a1 is greater than the first deceleration threshold value Xn, then the routine proceeds to step S61 wherein the normal gear shift control operation, as described above with reference to FIG. 14, is disabled to inhibit the upshift of the automatic transmission.

Next, the routine proceeds to step S71 wherein it is determined whether the locus defined by the relation between the position of the accelerator pedal 70 and the speed of the vehicle during acceleration or deceleration thereof has now intersected with one of the downshift gear shift lines DS, as illustrated in FIG. 14, or not which instructs the automatic transmission to shift down to a lower speed gear. If a YES answer is obtained meaning that the fact that the vehicle has decelerated, so that the speed of the vehicle has reached a given value at which the vehicle should be downshifted is detected, then the routine proceeds to step S81 wherein the gear shift inhibition operation which inhibits the upshift of the automatic transmission is terminated. The routine proceeds to step S91 wherein the normal gear shift control operation, as shown in FIG. 14, is resumed. The routine then terminates. Alternatively, if a NO answer is obtained in step S51 meaning that the deceleration a1 is smaller than or equal to the first deceleration threshold value Xn, then the routine proceeds to step S91 wherein the normal gear shift control operation, as shown in FIG. 14, is resumed.

For instance, when the brake pedal 80 has been depressed suddenly to decelerate the vehicle greatly immediately before the vehicle is required to be upshifted from the first to the second speed, as demonstrated in FIG. 14, and accelerated, the gear shift control system 10 immediately inhibits, as demonstrated by solid lines in FIGS. 5A to 5E, the automatic transmission from upshifting according to the gear shift control program of FIG. 4, thereby producing a degree of engine braking which is greater than that, as demonstrated by broken lines in FIGS. 5A to 5E, when the automatic transmission is not inhibited from upshifting.

Figure 5A:
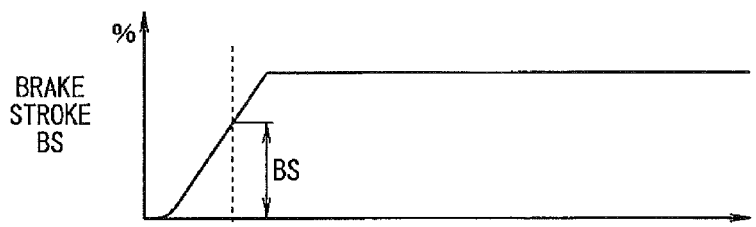
FIG. 5A is a graph which demonstrates a stroke of a brake pedal.
Figure 5B:
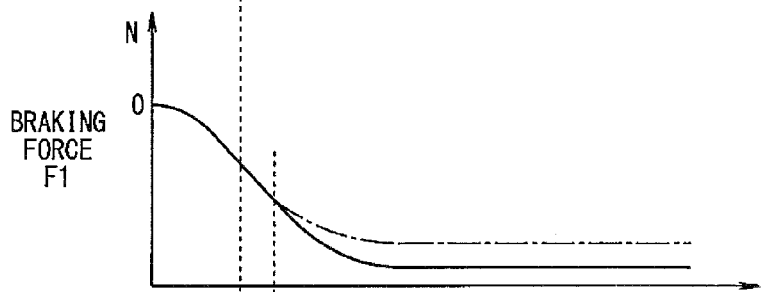
FIG. 5B is a graph which demonstrates a change in braking force applied to a wheel of a vehicle in gear shift inhibition control and standard gear shift control.
Figure 5C:
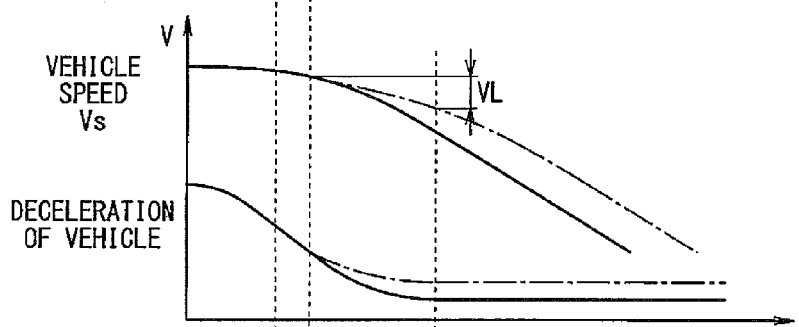
FIG. 5C is a graph which demonstrates a relation between the speed of a vehicle and the rate of deceleration of the vehicle in gear shift inhibition control and standard gear shift control.
Figure 5D:
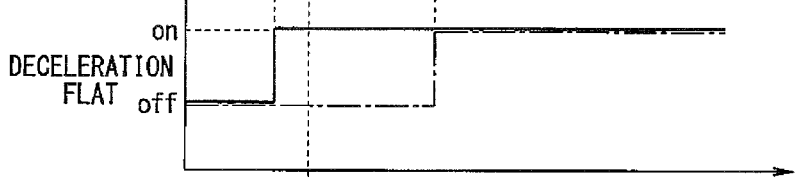
FIG. 5D is a graph which illustrates a deceleration flag used in initiating gear shift inhibition control of the gear shift control system of FIG. 1.
Figure 5E:
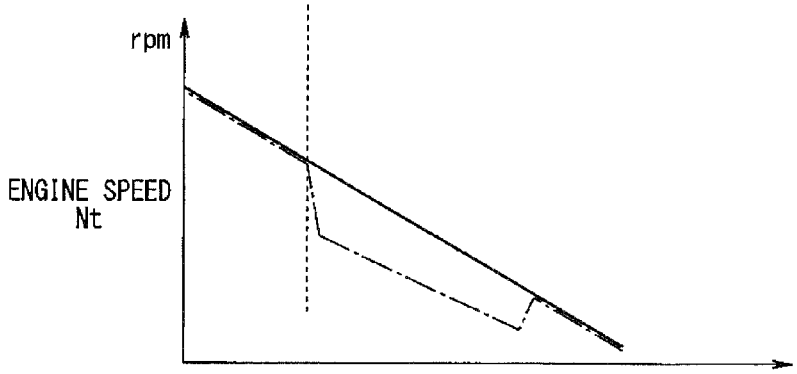
FIG. 5E is a graph which demonstrates a change in speed of a vehicle in gear shift inhibition control and standard gear shift control.

FIGS. 5A to 5E show the example where the brake pedal 80 is depressed fully, so that the stroke BS reaches 100%. When the deceleration a1 which is derived in step S41 as a function of the braking force F1 in relation to the stroke BS of the brake pedal 80 and the vehicle speed Vs exceeds the first deceleration threshold value Xn, the automatic transmission ECU 11 sets, as illustrated in FIG. 5D, a deceleration flag to "on" and inhibits the automatic transmission from upshifting automatically. This causes, as can be indicated by solid lines in FIGS. 5B and 5C, the degree of braking force (i.e., the rate of deceleration of the vehicle) which is greater than that when the automatic transmission is permitted to upshift to be produced, thereby resulting in, as illustrated in FIG. 5C, a quick drop in vehicle speed Vs. The automatic transmission ECU 11 of this embodiment is, as described above, designed to initiate the gear shift inhibition operation of FIG. 4 when the stroke BS of the brake pedal 80 is less than 100%, but the deceleration a1 exceeds the first threshold value Xn, however, may alternatively be engineered to execute the gear shift inhibition operation, provided that the stroke BS reaches 100%.

In the case where the automatic transmission ECU 11 continues to execute the normal gear shift control operation, as demonstrated by dashed lines in FIGS. 5A to 5E, without executing the gear shift inhibition operation of FIG. 4, a great degree of engine braking is initially applied to the wheels 60 as well as the application of braking force, as produced by the brake actuators of the vehicle, upon depression of the brake pedal 80, so that the vehicle decelerates greatly. The automatic transmission, however, may be upshifted depending upon the speed of the vehicle and the position of the accelerator pedal 70. Such upshifting will result in a decrease in degree of the engine braking, that is, a decrease in total amount of braking force applied to the wheels 60, so that the deceleration of the vehicle drops. The prior art gear shift control system, like in the publication referred to in the introductory part of this application, usually takes a given period of time to derive the rate of deceleration of the vehicle (i.e., a drop in speed VL, as illustrated in FIG. 5C after the vehicle begins to decelerate. This may cause the automatic transmission to have already upshifted at the time when the deceleration flag is set to "on".

When the deceleration a1 exceeds the first deceleration threshold value Xn upon depression of the brake pedal 80, so that the deceleration flag is set to "on", the gear shift control system 10 of this embodiment, as demonstrated by solid lines in FIGS. 5A to 5E, decelerates the vehicle without upshifting the automatic transmission from, for example, the second speed, to decrease the speed of the vehicle and subsequently downshifts the automatic transmission to the first speed.

Upon the downshift to the first speed, the speed of the vehicle temporarily rises and then drops. The gear shift control system 10, therefore, permits the internal combustion engine to run at a set idle speed without decreasing the engine speed Nt below a limit speed SL which will result in stall of the engine. Specifically, when it is required to decelerate the vehicle quickly while the automatic transmission is accelerating, for example, at the second speed, the gear shift control system 10 works to avoid a sudden drop in engine speed Nt, as indicated by a two-dot chain line in FIG. 7, which exceeds the limit speed SL at which the internal combustion engine will stall.

Figure 6:
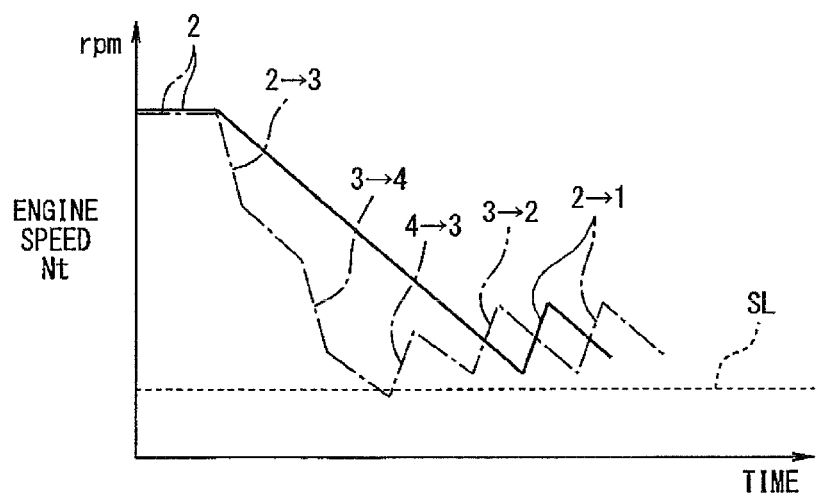
FIG. 6 is a graph which demonstrates an example of a change in speed of an internal combustion engine arising from gear shifting of an automatic transmission.
Figure 7:
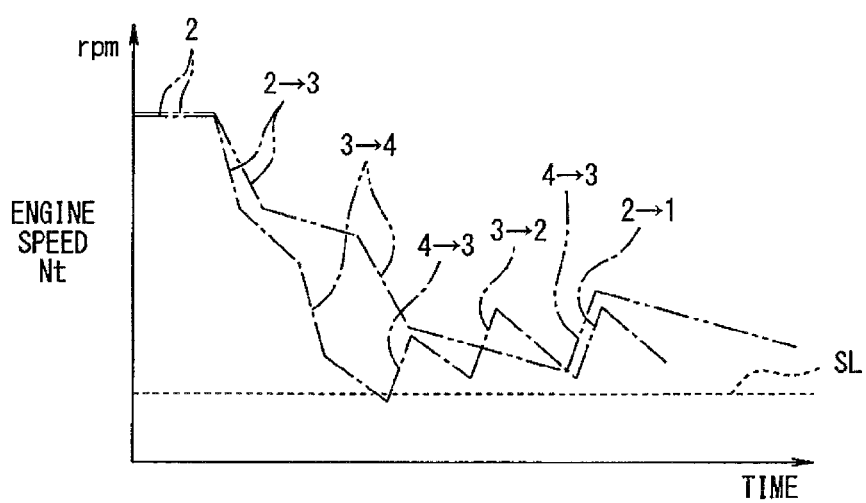
FIG. 7 is a graph which demonstrates an example of changes in speed of an internal combustion engine arising from gear shifting of an automatic transmission in gear shift inhibition control of the gear shift control system of FIG. 1 and standard gear shift control.

When the automatic transmission ECU 11 continues to execute the normal gear shift control operation, it may cause the automatic transmission, as indicated by dashed lines in FIGS. 6 and 7, to upshift from the second to third speed and to the fourth speed as a function of the relation between the position of the accelerator pedal 70 and the speed of the vehicle. This may result in an undesirable great drop in speed of the internal combustion engine below the limit speed SL at which the internal combustion engine will stall. Such a speed drop will cause the automatic transmission to subsequently downshift from the fourth to third speed and to the second speed, thus resulting in sudden application of the engine braking, which leads to the deterioration in ride quality and drivability of the vehicle.

Upon detection of depression of the brake pedal 80 of the vehicle to apply the brakes, the gear shift control system 10 of this embodiment begins to calculate the deceleration a1 as a function of the vehicle speed Vs and the braking force F1 and, when the deceleration a1 is greater than the first deceleration threshold value Xn, inhibits the automatic transmission from upshifting. This eliminates the possibility of engine stall when the internal combustion engine starts decelerating suddenly during acceleration thereof and ensures a great amount of braking force applied to the wheels 60 without undue gear shifts of the automatic transmission which will result in deterioration of ride quality of drivability of the vehicle, thus enabling the vehicle to decelerate or stop quickly and safely.

Figure 8:
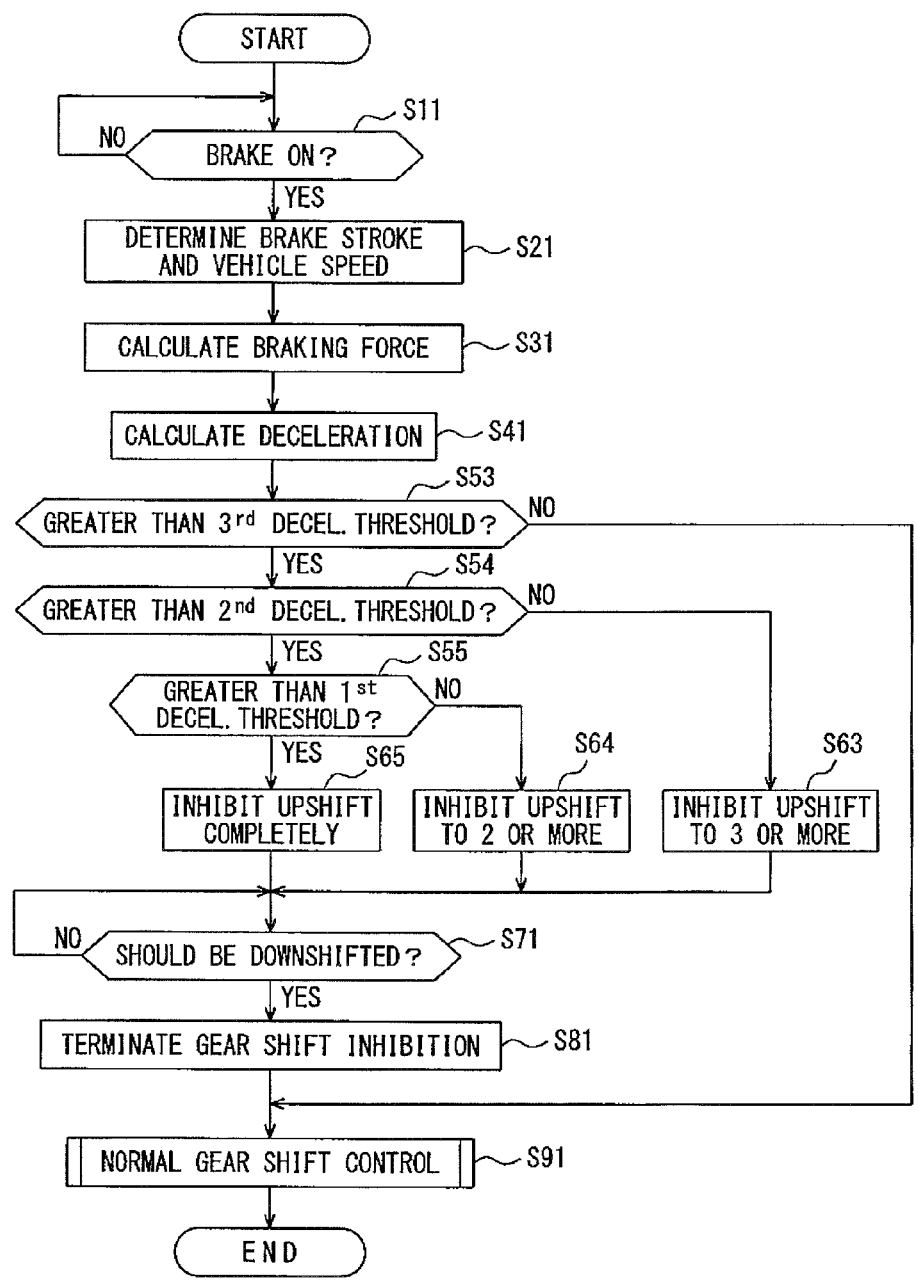
FIG. 8 is a flowchart of a gear shift control program to be executed by a gear shift control system of the second embodiment.

FIG. 8 illustrates the second embodiment of the gear shift control system 10 for the automatic transmission (i.e., the automatic transmission system 50). The gear shift control system 10 of this embodiment is identical in structure with that in the first embodiment. The same reference numbers, as employed in the first embodiment, will refer to the same parts. The same applies to other embodiments, as will be discussed later.

The gear shift control system 10 has three kinds of deceleration decision maps, such as the one in FIG. 3, stored in the memory 12. The memory 12 may, however, store two or more than three kinds of deceleration decision maps. Specifically, the memory 12 holds a first deceleration decision map which is identical with the one in FIG. 3 and used to calculate the first deceleration threshold value Xn at which the automatic transmission is inhibited from upshifting, a second deceleration decision map for use in calculate a second deceleration threshold value Xn which inhibits the automatic transmission from shifting up two or more gear ratios at once, in other words, permits the automatic transmission to perform a single upshift, and a third deceleration decision map for use in calculate a third deceleration threshold value Xn which inhibits the automatic transmission from shifting up three or more gear ratios at once, in other words, permits the automatic transmission to perform only an upshift of two or less gear ratios.

The automatic transmission ECU 11 of the gear shift control system 10 executes a gear shift control program, as shown in a flowchart of FIG. 8. When detecting the fact that the vehicle has started decelerating (step S11), the automatic transmission ECU 11 calculates the braking force F1 applied to the wheels 60 as a function of the stroke BS of the brake pedal 80 and the vehicle speed Vs (steps S21 and S31) and then substitutes the braking force F1, the travel resistance F2, as stored in the memory 12, and the weight M of the vehicle into the above Eq. (1) to derive the deceleration a1 (step S41).

Subsequently, it is determined whether the deceleration a1 is greater than the third deceleration threshold value Xn or not which is derived from the third deceleration decision map in the memory 12 as a function of the vehicle speed Vs (step S53).

If it is determined that the deceleration a1 is less than or equal to the third deceleration threshold value Xn, as derived as a function of the vehicle speed Vs, the normal gear shift control operation, as described above in FIG. 14, is executed (step S91). The gear shift control program is then terminated.

If the deceleration a1 is determined in step S53 to be greater than the third deceleration threshold value Xn, as derived as a function of the vehicle speed Vs, then it is determined whether the deceleration a1 is greater than the second deceleration threshold value Xn or not which is derived from the second deceleration decision map in the memory 12 as a function of the vehicle speed Vs (step S54).

If it is determined in step S54 that the deceleration a1 is less than or equal to the second deceleration threshold value Xn, as derived as a function of the vehicle speed Vs, a first gear shift inhibition operation is executed to inhibit the automatic transmission from shifting up three or more gear ratios, in other words, to permit the automatic transmission from upshifting within a range of two higher speed gear ratios (step S63). The routine then proceeds to step S71, as will be described later in detail.

Alternatively, if the deceleration a1 is determined in step S54 to be greater than the second deceleration threshold value Xn, as derived as a function of the vehicle speed Vs, it is determined whether the deceleration a1 is greater than the first deceleration threshold value Xn or not which is derived from the first deceleration decision map in the memory 12 as a function of the vehicle speed Vs (step S55).

If it is determined in step S55 that the deceleration a1 is less than or equal to the first deceleration threshold value Xn, as derived as a function of the vehicle speed Vs, a second gear shift inhibition operation is executed to inhibit the automatic transmission from shifting up two or more gear ratios, in other words, to permit the automatic transmission from upshifting only to one higher speed gear ratio (step S64). The routine then proceeds to step S71, as will be described later in detail.

Alternatively, if it is determined in step S55 that the deceleration a1 is greater than the first deceleration threshold value Xn, as derived as a function of the vehicle speed Vs, a third gear shift inhibition operation is executed to inhibit the automatic transmission from shifting up completely (step S65). The routine then proceeds to step S71, as will be described later in detail. Note that the first deceleration threshold value Xn is greater than the second and third deceleration threshold value Xn, and the second deceleration threshold value Xn is greater than the third deceleration threshold value Xn.

In step S71, it is determined whether the locus representing the relation between the position of the accelerator pedal 70 and the speed of the vehicle during deceleration thereof has now intersected with one of the downshift gear shift lines DS, as illustrated in FIG. 14, or not which instructs the automatic transmission to shift down to a lower gear ratio, in other words, whether the speed of the vehicle has dropped to the value which requires the automatic transmission to downshift. If a YES answer is obtained, the gear shift inhibition operation which inhibits the upshift is terminated (step S81). The routine then proceeds to step S91 wherein the normal gear shift control operation, as shown in FIG. 14, is resumed and then terminates.

As apparent from the above discussion, the gear shift control system 10 works to decrease the number of gear ratios to which the automatic transmission is permitted to upshift or inhibit the automatic transmission from upshifting as the speed of the vehicle increases to provide a degree of engine braking depending upon the deceleration of the vehicle.

The automatic transmission ECU 11 of this embodiment is, as described above, engineered not merely to inhibit the automatic transmission from upshifting, but to partially permit the automatic transmission to upshift depending upon the rate of deceleration of the vehicle, thereby applying an amount of engine braking force to the wheels 60 of the vehicle which is suitable for the rate of deceleration of the vehicle without the engine stall or undesirable frequent shifting operations of the automatic transmission. This avoids over-application of the engine braking to the wheels 60 even when the deceleration of the vehicle is low and also ensures the ride quality of the vehicle.

Figure 9:
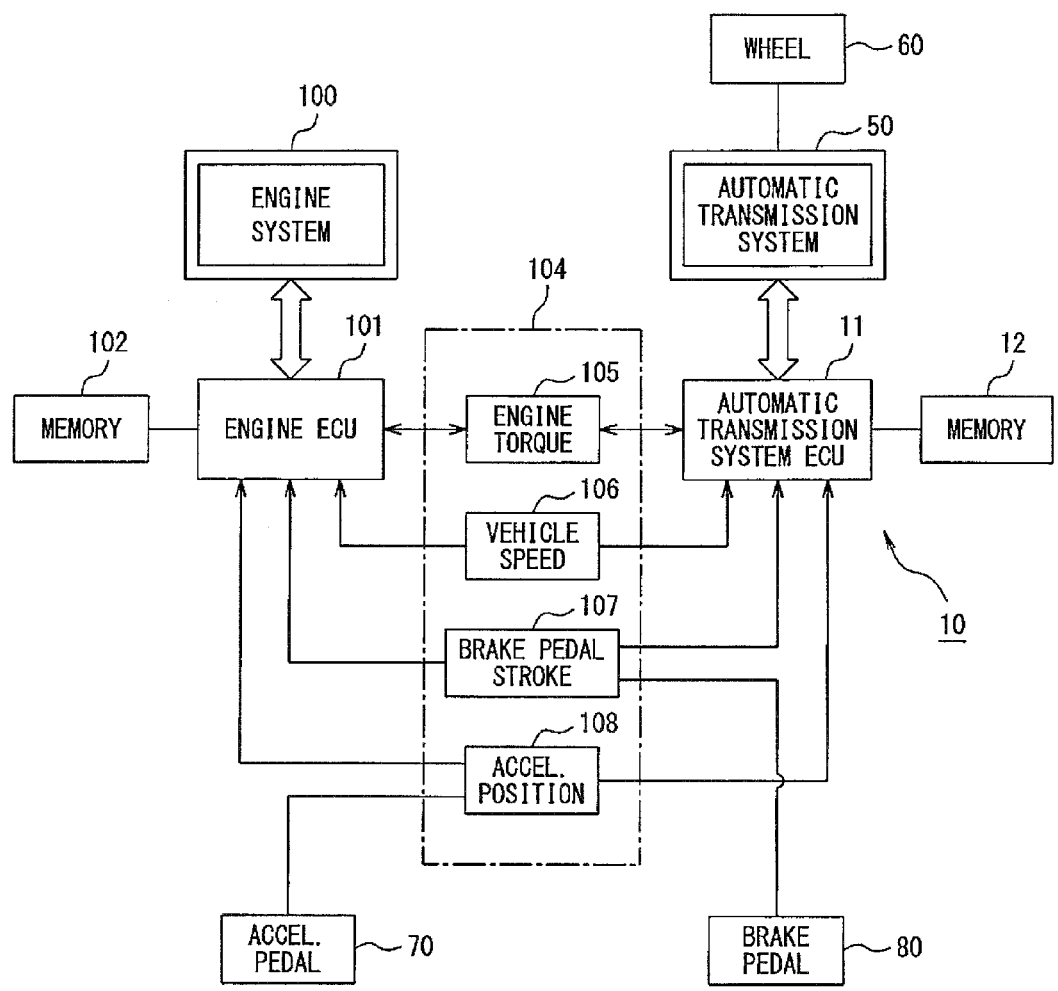
FIG. 9 is a block diagram which illustrates a gear shift control system of the third embodiment for an automatic transmission which is mounted in an automotive vehicle.
Figure 10:
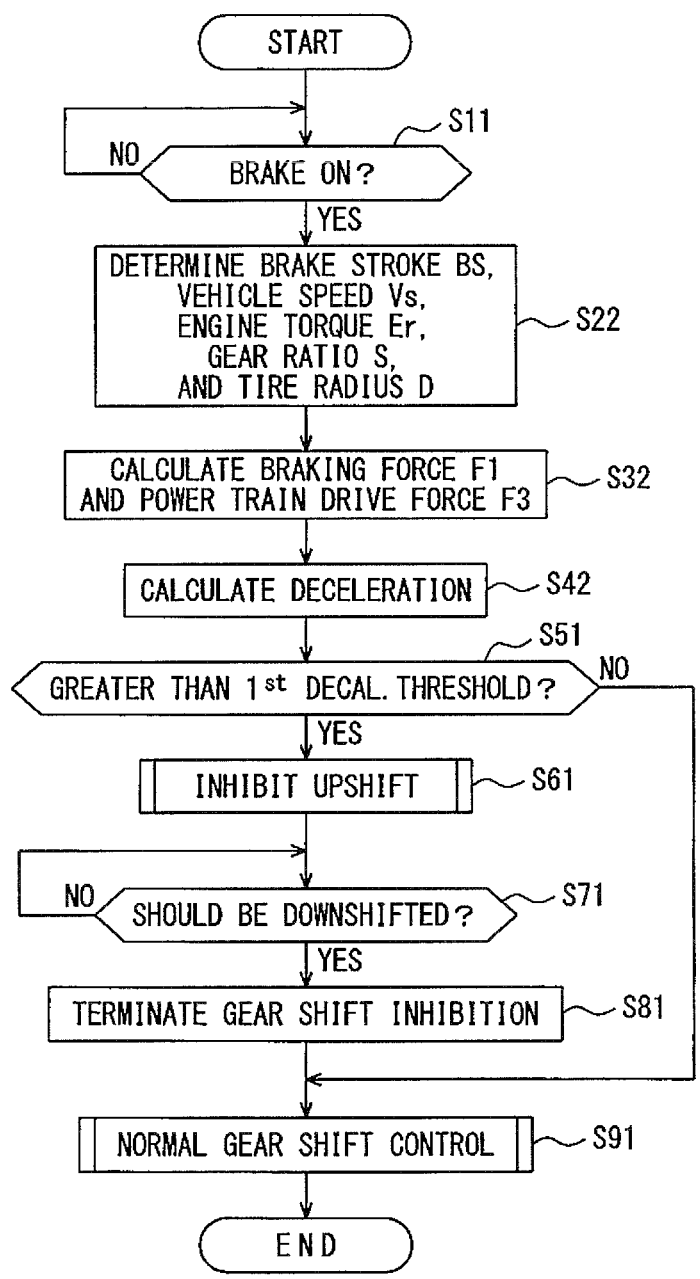
FIG. 10 is a flowchart of a gear shift control program to be executed by the gear shift control system of FIG. 9.

FIGS. 9 and 10 illustrate an example of a vehicle in which the gear shift control system 10 of the third embodiment is mounted.

In FIG. 9, the automatic transmission ECU 11 of the gear shift control system 10 includes the vehicle speed determiner 106, the brake pedal stroke determiner 107, and the accelerator position determiner 108 which are shared with the engine ECU 101 and also includes the engine torque determiner 105 to select one of the gear ratios of the automatic transmission based on running conditions of the vehicle. Specifically, the gear shift control system 10 is equipped with the automatic transmission ECU 11, the memory 12, the engine torque determiner 105, the vehicle speed determiner 106, the brake pedal stroke determiner 107, and the accelerator position determiner 108.

The automatic transmission ECU 11 of the gear shift control system 10 executes a gear shift control program, as shown in a flowchart of FIG. 10. The same step numbers as employed in FIGS. 4 and 8 refer to the same operations, and explanation thereof in detail will be omitted here. When detecting the fact that the vehicle has started decelerating (step S11), the automatic transmission ECU 11 derives the stroke BS of the brake pedal 80, the vehicle speed Vs, the engine torque Er outputted from the internal combustion engine, as determined by the engine torque determiner 107, the gear ratio S, as provided by the automatic transmission ECU 11 by itself, and the effective radius D of the wheels 60, as pre-stored in the memory 12 (step S22).

Subsequently, the automatic transmission ECU 11 calculates the braking force F1 applied to the wheels 60 and then substitutes the engine torque Er, the gear ratio S, and the effective radius D of the wheels 60 into an equation (2) below to derive a power train drive force F3 (i.e., the engine braking force) which acts on to drive a power train of the vehicle (step S32). The automatic transmission ECU 11 also substitutes the braking force F1, as derived in step S32, the travel resistance F2, as stored in the memory 12, the weight M of the vehicle, and the power train drive force F3 into the above an equation (3), as shown below, to derive a deceleration a2 (step S42). Note that the gear ratio S is given by the product of a gear ratio in a gear position selected in the automatic transmission and a final gear ratio. The final gear ratio is a gear ratio of a final gear. The final gear is usually mounted in a differential which allows the right and left wheels 60 to rotate at different speeds while the vehicle is turning. The differential works to reduce through the final gear the speed of the internal combustion engine which has been already reduced by the automatic transmission and transmit it to the wheels 60.

$$F3 = Er \times S/D \qquad (2)$$

$$a2 = (F1 + F2 + F3)/M \qquad (3)$$

Subsequently, it is determined in the same manner, as in the first embodiment, whether the deceleration a2 is greater than the first deceleration threshold value Xn or not which is derived as a function of the vehicle speed Vs (step S51).

If it is determined that the deceleration a2 is greater than the first deceleration threshold value Xn, as derived as a function of the vehicle speed Vs, the gear shift inhibition operation is executed to inhibit the automatic transmission from shifting up (step S61). In step S71, it is determined whether the locus representing the relation between the position of the accelerator pedal 70 and the speed of the vehicle during deceleration thereof has now intersected with one of the downshift gear shift lines DS, as illustrated in FIG. 14, or not which instructs the automatic transmission to shift down to a lower gear ratio, in other words, whether the speed of the vehicle has dropped to the value at which the automatic transmission should be downshifted. If a YES answer is obtained, the gear shift inhibition operation which inhibits the upshift is terminated (step S81). The routine then proceeds to step S91 wherein the normal gear shift control operation, as shown in FIG. 14, is resumed. The routine then terminates.

Alternatively, if it is determined in step S51 that the deceleration a2 is less than or equal to the first deceleration threshold value Xn, the routine proceeds directly to step S91 wherein the normal gear shift control operation, as shown in FIG. 14, is resumed and then terminates.

As apparent from the above discussion, the gear shift control system 10 is designed to calculate the deceleration a2 of the vehicle as a function of an additional parameter, i.e., the power train drive force F3, thus enhancing the accuracy in inhibiting the automatic transmission from upshifting in the gear shift inhibition mode.

Figure 11:
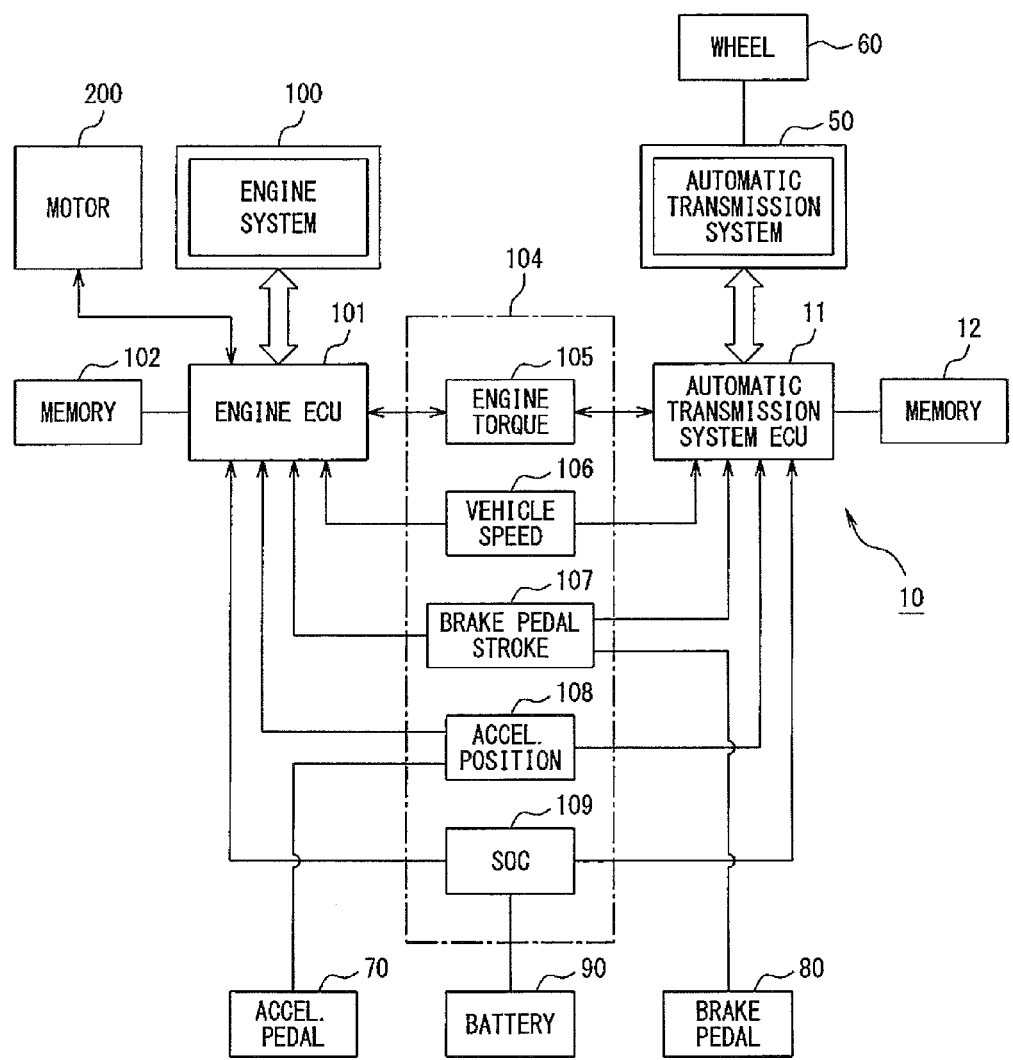
FIG. 11 is a block diagram which illustrates a gear shift control system of the fourth embodiment for an automatic transmission which is mounted in an automotive vehicle.
Figure 12:
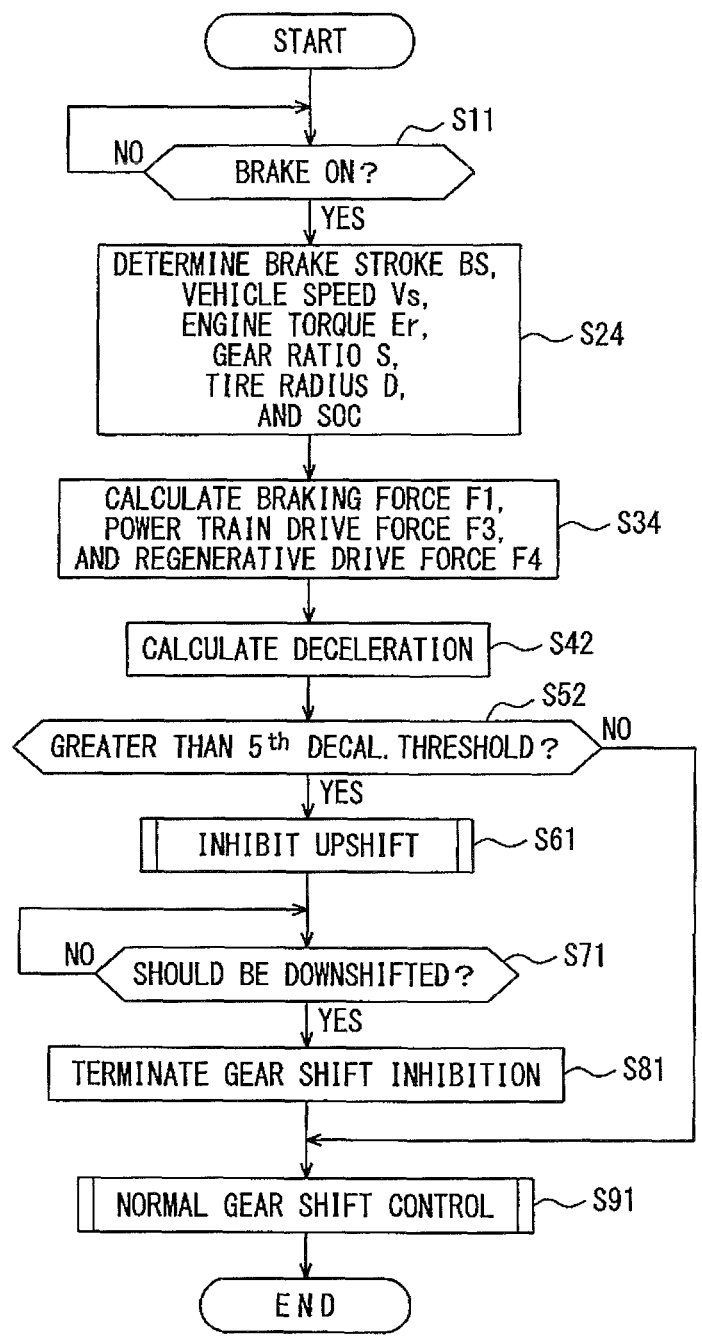
FIG. 12 is a flowchart of a gear shift control program to be executed by the gear shift control system of FIG. 11.

FIGS. 11 to 13 illustrates the gear shift control system 10 according to the fourth embodiment.

In FIG. 11, the gear shift control system 10 is mounted in a hybrid electric vehicle (HEV) equipped with a combination of a gasoline-powered internal combustion engine (i.e., the engine system 100) and an electric motor 200 driven by electric power stored in a storage battery 90 which are used as a drive source to produce torque to rotate wheels 60 of the vehicle. The storage battery 90 of the vehicle can be recharged by an external power supply. The electric motor 200 may be engineered as an electric generator to produce electric energy. Alternatively, a separate electric generator may be installed in the vehicle. The electric generator (i.e., the electric motor 200 or the separate electric generator), which will also be referred as a generator motor 200 below, is driven in a regenerative braking mode during running or decelerating of the vehicle to produce the regenerative electric energy for use in recharging the storage battery 90 in the vehicle.

The engine ECU 101 executes coordination control to drive the engine as a function of an amount of electric energy remaining in the storage battery 90, as measured by an SOC determiner 109, for charging the battery 90. The SOC determiner 109 is designed to determine a state of charge (SOC) of the battery 90 as indicating the amount of electric energy remaining in the battery 90. The storage battery 90 is, as described above, mounted in the vehicle to supply the electric power to the electric motor 200, spark plugs installed in the engine, and electric components of an air conditioner.

The automatic transmission ECU 11 of the gear shift control system 10 includes the engine torque determiner 105, the vehicle speed determiner 106, the brake pedal stroke determiner 107, and the accelerator position determiner 108, and the SOC determiner 109 which are shared with the engine ECU 101 and works to execute gear shift control to select one of the gear ratios of the automatic transmission based on running conditions of the vehicle. Specifically, the gear shift control system 10 is equipped with the automatic transmission ECU 11, the memory 12, the engine torque determiner 105, the vehicle speed determiner 106, the brake pedal stroke determiner 107, the accelerator position determiner 108, and the SOC determiner 109.

The automatic transmission ECU 11 executes a gear shift control program, as shown in a flowchart of FIG. 12. The same step numbers as employed in FIGS. 4, 8, and 10 refer to the same operations, and explanation thereof in detail will be omitted here. When detecting the fact that the vehicle has started decelerating (step S11), the automatic transmission ECU 11 derives the stroke BS of the brake pedal 80, the vehicle speed Vs, the engine torque Er, the gear ratio S, the effective radius D of the wheels 60, and the SOC of the battery 90, as measured by the SOC determiner 109 (step S24).

Subsequently, the automatic transmission ECU 11 determines the braking force F1 applied to the wheels 60 and the power train drive force F3 in the same manner, as described above. Additionally, the automatic transmission ECU 11 also calculates a regenerative electric energy being charged in the storage battery 90 as a function of a change in the SOC, as measured by the SOC determiner 109, per unit time, and derives a regenerative drive force F4 (i.e., regenerative braking force acting on the wheels 60) that is force used to drive the generator motor 200 to produce the calculated regenerative electric energy (step S34). The automatic transmission ECU 11 then substitutes the braking force F1, the travel resistance F2, the power train drive force F3, the weight M of the vehicle, and the regenerative drive force F4 into an equation (4), as shown below, to derive a deceleration a3 (step S42).

$$a3=(F1+F2+F3+F4)/M \quad (4)$$

Subsequently, the automatic transmission ECU 11 adds a threshold value Yn (also referred to as a fourth deceleration threshold value) to the first deceleration threshold value Xn, as described in the first embodiment, to derive a fifth deceleration threshold value Zn. The fourth deceleration threshold value Yn is determined by look-up using a fourth deceleration decision map, as illustrated in FIG. 13, stored in the memory 12. The fourth deceleration threshold value Yn is listed in relation to the regenerative drive force produced as a function of the speed of the vehicle. The automatic transmission ECU 11 determines whether the deceleration a3 is greater than the fifth deceleration threshold value Zn or not (step S52).

If it is determined that the deceleration a3 is greater than the fifth deceleration threshold value Yn, the gear shift inhibition operation is executed to inhibit the automatic transmission from shifting up (step S61). In step S71, it is determined whether the locus representing the relation between the position of the accelerator pedal 70 and the speed of the vehicle during deceleration thereof has now intersected with one of the downshift gear shift lines DS, as illustrated in FIG. 14, or not which instructs the automatic transmission to shift down to a lower gear ratio, in other words, whether the speed of the vehicle has dropped to the value at which the automatic transmission should be downshifted. If a YES answer is obtained, the gear shift inhibition operation which inhibits the upshift is terminated (step S81). The routine then proceeds to step S91 wherein the normal gear shift control operation, as shown in FIG. 14, is resumed and then terminates.

Alternatively, if it is determined in step S52 that the deceleration a3 is less than or equal to the fifth deceleration threshold value Zn, the routine proceeds directly to step S91 wherein the normal gear shift control operation, as shown in FIG. 14, is resumed and then terminates.

As apparent from the above discussion, the gear shift control system 10 is designed to calculate the deceleration a3 of the vehicle as a function of an additional parameter, i.e., the regenerative drive force F4, thus enhancing the accuracy in inhibiting the automatic transmission from upshifting when the hybrid electric vehicle is decelerating in the regenerative braking mode.

The gear shift control system 10 of this embodiment is, as described above, mounted in the hybrid vehicle, but may be used with an electric vehicle in which an internal combustion engine is not mounted and which is equipped with a gear shift mechanism.

The regenerative drive force is calculated based on the regenerative electric energy that is derived as a function of a change in the SOC of the battery 90, as measured by the SOC determiner 109, per unit time, but may be derived by directly measuring the amount of current charged in the battery 90 to determine the regenerative electric energy.

The fact that the vehicle has started decelerating is found by monitoring the amount by which the brake pedal 80 is depressed, but the calculation of the braking forces, as described above, may be initiated in response to release of the accelerator pedal 70, as detected by the accelerator position determiner 108. For instance, the automatic transmission ECU 11 may calculate the braking force (i.e., the braking force F1) which arises from the release of the accelerator pedal 70, as sensed y the accelerator position determiner 108.

The automatic transmission ECU 11 may work to determine one or the sum of an engine braking force, as produced by the internal combustion engine (i.e., the engine system 100), and a regenerative braking force, as produced by the electric generator 200, as the braking force (e.g., the braking force F1) applied to the wheel 60 and calculate the degree of deceleration (e.g., the deceleration a1, a2, or a3) of the vehicle as a function of such a braking force.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A gear shift control system for an automatic transmission mounted in a vehicle to transmit torque, as produced by a power source, to a wheel of the vehicle, comprising:
a speed determiner which works to determine a speed of the vehicle;
a deceleration detector which detects deceleration of the vehicle when a braking force is being applied to the wheel;
a braking force determiner which determines the braking force applied to the wheel when the deceleration detector is detecting the deceleration of the vehicle;
a deceleration determiner which determines a deceleration of the vehicle as a function of the speed of the vehicle, as determined by the speed determiner, and the braking force, as determined by the braking force determiner;

a gear shift controller which determines whether the deceleration of the vehicle, as determined by the deceleration determiner, is greater than a given deceleration threshold, and when the deceleration of the vehicle is determined to be greater than the given deceleration threshold, the gear shift controller inhibits the automatic transmission from upshifting gears thereof; and wherein the given deceleration threshold is variable with vehicle speed and the gear shift control system determines a higher value for the given deceleration threshold at a higher vehicle speed and a lower value for the given deceleration threshold at a lower vehicle speed.

2. A gear shift control system as set forth in claim 1, wherein the vehicle is equipped with a brake pedal which is responsive to depression thereof to produce the braking force, further comprising an amount-of-braking effort determiner which determines an amount by which the brake pedal is depressed, wherein the deceleration detector detects the deceleration of the vehicle when the braking force is being applied to the wheel in response to the depression of the brake pedal, and wherein the braking force determiner calculates the braking force applied to the wheel when the deceleration detector is detecting the deceleration of the vehicle as a function of the speed of the vehicle, as determined by the speed determiner, and the amount by which the brake pedal is depressed, as determined by the amount-of-braking effort determiner.

3. A gear shift control system as set forth in claim 1, wherein the vehicle is equipped with an accelerator pedal which is responsive to depression thereof to accelerate the vehicle, further comprising an amount-of-acceleration determiner which works to determine an amount by which the accelerator pedal is depressed, wherein the deceleration detector detects the deceleration of the vehicle when the braking force is being applied to the wheel in response to release of the accelerator pedal, and wherein the braking force determiner calculates the braking force applied to the wheel which arises from the release of the accelerator pedal.

4. A gear shift control system as set forth in claim 3, wherein the vehicle is equipped with an internal combustion engine which produces the braking force applied to the wheel, and wherein the braking force determiner determines an engine braking force, as produced by the internal combustion engine.

5. A gear shift control system for an automatic transmission mounted in a vehicle to transmit torque, as produced by a power source, to a wheel of the vehicle, comprising:
a speed determiner which works to determine a speed of the vehicle;
a deceleration detector which detects deceleration of the vehicle when a braking force is being applied to the wheel;
a braking force determiner which determines the braking force applied to the wheel when the deceleration detector is detecting the deceleration of the vehicle;
a deceleration determiner which determines a deceleration of the vehicle as a function of the speed of the vehicle, as determined by the speed determiner, and the braking force, as determined by the braking force determiner;
a gear shift controller which determines whether the deceleration of the vehicle, as determined by the deceleration determiner, is greater than a given deceleration threshold, and when the deceleration of the vehicle is determined to be greater than the given deceleration threshold, the gear shift controller inhibits the automatic transmission from upshifting gears thereof;

wherein the vehicle is equipped with an accelerator pedal which is responsive to depression thereof to accelerate the vehicle, further comprising an amount-of-acceleration determiner which works to determine an amount by which the accelerator pedal is depressed, wherein the deceleration detector detects the deceleration of the vehicle when the braking force is being applied to the wheel in response to release of the accelerator pedal, and wherein the braking force determiner calculates the braking force applied to the wheel which arises from the release of the accelerator pedal; and wherein the vehicle is equipped with an electric generator which produces the braking force applied to the wheel, and wherein the braking force determiner determines a regenerative electric energy which is produced by the electric generator and being charged in a storage battery mounted in the vehicle and calculates the regenerative braking force based on the determined regenerative electric energy to determine the braking force.

6. A gear shift control system for an automatic transmission mounted in a vehicle to transmit torque, as produced by a power source, to a wheel of the vehicle, comprising:
a speed determiner which works to determine a speed of the vehicle;
a deceleration detector which detects deceleration of the vehicle when a braking force is being applied to the wheel;
a braking force determiner which determines the braking force applied to the wheel when the deceleration detector is detecting the deceleration of the vehicle;
a deceleration determiner which determines a deceleration of the vehicle as a function of the speed of the vehicle, as determined by the speed determiner, and the braking force, as determined by the braking force determiner;
a gear shift controller which determines whether the deceleration of the vehicle, as determined by the deceleration determiner, is greater than a given deceleration threshold, and when the deceleration of the vehicle is determined to be greater than the given deceleration threshold, the gear shift controller inhibits the automatic transmission from upshifting gears thereof; and wherein the given deceleration threshold changes to have one of a plurality of values as a function of the speed of the vehicle, the plurality of values being different from each other, when the deceleration of the vehicle is determined to be greater than a greatest one of the values, the gear shift controller inhibiting the automatic transmission from upshifting gears thereof, when the deceleration of the vehicle is determined to be greater than one of the values other than the greatest one, the gear shift controller permitting an upshifting by one gear ratio but inhibiting the automatic transmission from upshifting in a range of a given number of gear ratios with the given number of gear ratios being greater than one, the smaller the value, the greater the given number of gear ratios.

7. A gear shift control system for an automatic transmission mounted in a vehicle to transmit torque, as produced by a power source, to a wheel of the vehicle, comprising:
a speed determiner which works to determine a speed of the vehicle;
a deceleration detector which detects deceleration of the vehicle when a braking force is being applied to the wheel;
a braking force determiner which determines the braking force applied to the wheel when the deceleration detector is detecting the deceleration of the vehicle;

a deceleration determiner which determines a deceleration of the vehicle as a function of the speed of the vehicle, as determined by the speed determiner, and the braking force, as determined by the braking force determiner;

a gear shift controller which determines whether the deceleration of the vehicle, as determined by the deceleration determiner, is greater than a given deceleration threshold, and when the deceleration of the vehicle is determined to be greater than the given deceleration threshold, the gear shift controller inhibits the automatic transmission from upshifting gears thereof; and wherein the given deceleration threshold is a first given deceleration threshold, and when the deceleration of the vehicle is determined to be greater than the first given deceleration threshold, the gear shift controller inhibits any upshifting of the automatic transmission, and further wherein when the deceleration of the vehicle is determined to be greater than a second given deceleration threshold the gear shift controller inhibits upshifting of two or more gear ratios at once but allows upshifting by one gear ratio, and wherein the second given deceleration threshold is lower than the first given deceleration threshold.

8. A gear shift control system for an automatic transmission mounted in a vehicle to transmit torque, as produced by a power source, to a wheel of the vehicle, comprising:

a speed determiner which works to determine a speed of the vehicle;

a deceleration detector which detects deceleration of the vehicle when a braking force is being applied to the wheel;

a braking force determiner which determines the braking force applied to the wheel when the deceleration detector is detecting the deceleration of the vehicle;

a deceleration determiner which determines a deceleration of the vehicle as a function of the speed of the vehicle, as determined by the speed determiner, and the braking force, as determined by the braking force determiner;

a gear shift controller which determines whether the deceleration of the vehicle, as determined by the deceleration determiner, is greater than a given deceleration threshold, and when the deceleration of the vehicle is determined to be greater than the given deceleration threshold, the gear shift controller inhibits the automatic transmission from upshifting gears thereof; and wherein the vehicle is equipped with an electric generator which produces the braking force applied to the wheel, and wherein the braking force determiner determines a regenerative electric energy which is produced by the electric generator and being charged in a storage battery mounted in the vehicle and calculates the regenerative braking force based on the determined regenerative electric energy to determine the braking force.

9. A gear shift control system for an automatic transmission mounted in a vehicle to transmit torque, as produced by a power source, to a wheel of the vehicle, comprising:

a speed determiner which works to determine a speed of the vehicle;

a deceleration detector which detects deceleration of the vehicle when a braking force is being applied to the wheel;

a braking force determiner which determines the braking force applied to the wheel when the deceleration detector is detecting the deceleration of the vehicle;

a deceleration determiner which determines a deceleration of the vehicle as a function of the speed of the vehicle, as determined by the speed determiner, and the braking force, as determined by the braking force determiner;

a gear shift controller which determines whether the deceleration of the vehicle, as determined by the deceleration determiner, is greater than a given deceleration threshold, and when the deceleration of the vehicle is determined to be greater than the given deceleration threshold, the gear shift controller inhibits the automatic transmission from upshifting gears thereof;

wherein the vehicle is equipped with an accelerator pedal which is responsive to depression thereof to accelerate the vehicle, further comprising an amount-of-acceleration determiner which works to determine an amount by which the accelerator pedal is depressed, wherein the deceleration detector detects the deceleration of the vehicle when the braking force is being applied to the wheel in response to release of the accelerator pedal, and wherein the braking force determiner calculates the braking force applied to the wheel which arises from the release of the accelerator pedal; and wherein the vehicle is equipped with both an internal combustion engine and an electric generator which produce the braking force applied to the wheel, and wherein the braking force determiner determines the braking force applied to the wheel as a sum of an engine braking force and a regenerative braking force.

* * * * *